US011491725B2

(12) United States Patent
Feller et al.

(10) Patent No.: US 11,491,725 B2
(45) Date of Patent: Nov. 8, 2022

(54) VAPOR SPIN CLEANING OF ADDITIVELY MANUFACTURED PARTS

(71) Applicant: Carbon, Inc., Redwood City, CA (US)

(72) Inventors: Bob E. Feller, San Mateo, CA (US); W. Ryan Powell, Sunnyvale, CA (US); Mark O. Kaufman, Mountain View, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/719,827

(22) Filed: Apr. 13, 2022

(65) Prior Publication Data

US 2022/0234296 A1 Jul. 28, 2022

Related U.S. Application Data

(63) Continuation-in-part of application No. PCT/US2021/052804, filed on Sep. 30, 2021.
(Continued)

(51) Int. Cl.
| | |
|---|---|
| *B08B 7/04* | (2006.01) |
| *B29C 64/35* | (2017.01) |
| *B33Y 40/20* | (2020.01) |
| *B08B 3/08* | (2006.01) |
| *B08B 5/00* | (2006.01) |
| *B08B 7/02* | (2006.01) |

(52) U.S. Cl.
CPC .............. *B29C 64/35* (2017.08); *B08B 3/08* (2013.01); *B08B 5/00* (2013.01); *B08B 7/02* (2013.01); *B08B 7/04* (2013.01); *B33Y 40/20* (2020.01)

(58) Field of Classification Search
CPC ... B29C 64/35; B33Y 40/20; B08B 3/08; B08B 5/00; B08B 7/02; B08B 7/04
See application file for complete search history.

(56) References Cited

U.S. PATENT DOCUMENTS

| | | |
|---|---|---|
| 3,013,365 A | 12/1961 | Harper |
| 4,087,924 A | 5/1978 | Fuji et al. |

(Continued)

FOREIGN PATENT DOCUMENTS

| | | |
|---|---|---|
| CN | 104303105 A | 1/2015 |
| DE | 102014010501 A1 | 1/2016 |

(Continued)

OTHER PUBLICATIONS

International Search Report and Written Opinion for PCT/US2021/052804, dated Jan. 26, 2022, 11 pages.
(Continued)

*Primary Examiner* — Sharidan Carrillo
(74) *Attorney, Agent, or Firm* — Myers Bigel, P.A.

(57) ABSTRACT

A method of cleaning residual resin from an additively manufactured object, includes: (a) enclosing an additively manufactured object in an inner chamber of a centrifugal separator, the additively manufactured object including a light polymerized resin with a surface coating of viscous, unpolymerized, residual resin; (b) flooding the chamber with a volatile organic solvent vapor without contacting liquid organic solvent to the object, the vapor present in an amount sufficient to reduce the viscosity of the residual resin; and (c) spinning the additively manufactured object in the chamber to centrifugally separate at least a first portion of the residual resin from the object.

15 Claims, 4 Drawing Sheets

Related U.S. Application Data (60) Provisional application No. 63/089,624, filed on Oct. 9, 2020.

(56) References Cited

U.S. PATENT DOCUMENTS

| | | | |
|---|---|---|---|
| 5,122,441 A | 6/1992 | Lawton et al. | |
| 5,236,637 A | 8/1993 | Hull | |
| 5,248,456 A | 9/1993 | Evans et al. | |
| 5,355,638 A | 10/1994 | Hoffman | |
| 5,391,072 A | 2/1995 | Lawton et al. | |
| 5,482,659 A | 1/1996 | Sauerhoefer | |
| 7,438,846 B2 | 10/2008 | John | |
| 7,709,544 B2 | 5/2010 | Doyle et al. | |
| 7,845,930 B2 | 12/2010 | Shkolnik et al. | |
| 7,892,474 B2 | 2/2011 | Shkolnik et al. | |
| 8,110,135 B2 | 2/2012 | El-Siblani | |
| 8,735,049 B2 | 5/2014 | Vest | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,498,920 B2 | 11/2016 | Desimone et al. | |
| 9,511,546 B2 | 12/2016 | Chen et al. | |
| 9,592,539 B2 | 3/2017 | Dunn et al. | |
| 9,993,974 B2 | 6/2018 | Desimone et al. | |
| 10,016,938 B2 | 7/2018 | Desimone et al. | |
| 10,093,064 B2 | 10/2018 | Desimone et al. | |
| 10,144,181 B2 | 12/2018 | Desimone et al. | |
| 10,150,253 B2 | 12/2018 | Desimone et al. | |
| 10,596,755 B2 | 3/2020 | Desimone et al. | |
| 10,618,215 B2 | 4/2020 | Desimone et al. | |
| 10,913,206 B2 | 2/2021 | Donovan et al. | |
| 11,084,216 B2 * | 8/2021 | Murillo | B29C 64/245 |
| 2003/0206820 A1 | 11/2003 | Keicher et al. | |
| 2004/0148048 A1 | 7/2004 | Farnworth | |
| 2004/0159340 A1 | 8/2004 | Hiatt et al. | |
| 2006/0022379 A1 | 2/2006 | Wicker et al. | |
| 2007/0179655 A1 | 8/2007 | Farnworth | |
| 2008/0087298 A1 | 4/2008 | Katou et al. | |
| 2009/0283119 A1 | 11/2009 | Moussa et al. | |
| 2011/0089610 A1 | 4/2011 | El-Siblani et al. | |
| 2011/0309554 A1 | 12/2011 | Liska et al. | |
| 2013/0292862 A1 | 11/2013 | Joyce | |
| 2013/0295212 A1 | 11/2013 | Chen et al. | |
| 2015/0331402 A1 | 11/2015 | Lin et al. | |
| 2015/0360419 A1 | 12/2015 | Willis et al. | |
| 2016/0137839 A1 | 5/2016 | Rolland et al. | |
| 2017/0129167 A1 | 5/2017 | Castanon | |
| 2017/0129169 A1 | 5/2017 | Batchelder et al. | |
| 2017/0173872 A1 | 6/2017 | McCall et al. | |
| 2017/0312763 A1 | 11/2017 | Mackel et al. | |
| 2018/0029311 A1 | 2/2018 | Depalma et al. | |
| 2018/0304526 A1 | 10/2018 | Feller et al. | |
| 2019/0029311 A1 | 1/2019 | Shin et al. | |
| 2019/0126547 A1 | 5/2019 | Desimone et al. | |
| 2019/0224917 A1 | 7/2019 | Venkatakrishnan et al. | |
| 2019/0389127 A1 | 12/2019 | Desimone et al. | |
| 2020/0139617 A1 | 5/2020 | Desimone et al. | |
| 2020/0198242 A1 | 6/2020 | John | |
| 2020/0215811 A1 | 7/2020 | Friedrich et al. | |
| 2020/0337813 A1 | 10/2020 | Kirchner et al. | |
| 2021/0086450 A1 | 3/2021 | Murillo et al. | |
| 2021/0213675 A1 | 7/2021 | Converse et al. | |
| 2021/0323234 A1 | 10/2021 | Day et al. | |

FOREIGN PATENT DOCUMENTS

| | | |
|---|---|---|
| EP | 1700656 A2 | 9/2006 |
| EP | 1700686 A2 | 9/2006 |
| JP | 2001342204 A | 12/2001 |
| JP | 2015120261 A | 7/2015 |
| WO | 0172501 A1 | 10/2001 |
| WO | 2011086450 A2 | 7/2011 |
| WO | 2017194177 A1 | 11/2017 |
| WO | 2018111548 A1 | 6/2018 |
| WO | 2019209732 A1 | 10/2019 |
| WO | 2020069152 A1 | 4/2020 |
| WO | WO-2021222086 A1 * | 11/2021 |
| WO | WO-2022076235 A1 * | 4/2022 |

OTHER PUBLICATIONS

Dendukuri, Dhananjay, et al., "Continuous-flow lithography for high-throughput microparticle synthesis", Nature Materials, 5, 2006, 365-369.

Dendukuri, Dhananjay, et al., "Modeling of Oxygen-Inhibited Free Radical Photopolymerization in a PDMS Microfluidic Device", Macromolecules, 41, 2008, 8547-8556.

Dendukuri, Dhananjay, et al., "Stop-flow lithography in a microfluidic device", The Royal Society of Chemistry, Lab on a Chip, 7, 2007, 818-828.

Morelli, Dean, "Protest to Canadian Patent Applications by Joseph DeSimone et al", Regarding Continuous Liquid Interphase Printing. Canadian patent applications CA2898098A1, CA 2898103A1, and CA2898106A1. Dec. 31, 2015. Canadian Intellectual Property Office, 37 pp.

Pan, Yayue, et al., "A Fast Mask Projection Stereolithography Process for Fabricating Digital Models in Minutes", J. Manufacturing Sci. and Eng. 134(5), 2012, 051011-1-9.

Stern, S. A., "The "Barrer" Permeability Unit", Journal of Polymer Science: Part A-2, 6(11), 1968, 1933-1934.

Tumbleston, John R., et al., "Continuous liquid interface production of 3D Objects", Science, 347(6228), 2015, 1349-1352.

Yasuda, H., et al., "Permeability of Polymer Membranes to Dissolved Oxygen", Journal of Polymer Science, 4, 1966, 1314-1316.

* cited by examiner

VAPOR SPIN CLEANING OF ADDITIVELY MANUFACTURED PARTS

RELATED APPLICATIONS

This is a continuation-in-part of International Patent Application No. PCT/US2021/052804, filed Sep. 30, 2021, which application claims priority from U.S. Provisional Patent Application No. 63/089,624, filed Oct. 9, 2020, the disclosures of which are incorporated by reference in their entireties.

FIELD OF THE INVENTION

The present invention concerns methods and apparatus for separating residual resin from the surface of an additively manufactured object.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606).

Stereolithography resins are generally viscous. As a result, excess, unpolymerized, resin adheres to the surface of such objects after they have been produced. This resin must be removed for further processing or use, but removal of such residual resin can be difficult.

Residual resin can be removed by centrifugal separation, such as described in Murillo and Dachs, *Resin extractor for additive manufacturing*, PCT Patent App. Pub. No. WO2019/209732 (31 Oct. 2019). High spin speeds can, however, cause distortion of the object, and low spin speeds can result in insufficient removal of residual resin.

Residual resin can also be removed by washing the objects in a liquid, such as described in McCall, Rolland, and Converse, U.S. Pat. No. 10,343,331. While washing can remove significant amounts of residual resin, it can also damage the underlying object, such as by extracting constituents of a dual cure resin required for the second cure.

Murillo and Dachs, supra, suggest spraying a solvent (isopropanol) on an object during centrifugal separation. However, the potential for damaging the underlying object by contacting to liquid solvent remains. In addition, spraying solvent on objects while they are in a fixed position for centrifugal separation can—in contrast to immersion for washing—result in uneven application of the solvent to surfaces, or an inability to reach surfaces for which separation of the resin is most important. Further, spinning of the object for centrifugal separation can result in uneven removal of the solvent with its residual resin and extracted constituents, leaving the objects with cosmetic defects such as streaked surfaces and/or structural defects due to uneven extraction of constituents from within the objects themselves. All of these problems are particularly exacerbated when the object being cleaned includes a plurality of surface portions oriented differently from one another (e.g., interior and exterior surfaces; horizontal and vertical surfaces; surfaces oriented at obtuse or acute angles to one another; different sections of convex or concave curved surface portions, combinations of the foregoing; etc.).

According, there remains a need for new approaches to separating residual resin from additively manufactured objects.

SUMMARY OF THE INVENTION

According to some embodiments of the present invention, a method of cleaning residual resin from an additively manufactured object, includes:

(a) enclosing an additively manufactured object in an inner chamber of a centrifugal separator, the additively manufactured object including a light polymerized resin with a surface coating of viscous, unpolymerized, residual resin;

(b) flooding the chamber with a volatile organic solvent vapor without contacting liquid organic solvent to the object, the vapor present in an amount sufficient to reduce the viscosity of the residual resin; and (c) spinning the additively manufactured object in the chamber to centrifugally separate at least a first portion of the residual resin from the object. The chamber itself can remain stationary, or can also be spun in the same (or opposite) direction as the object, during this spinning step.

In some embodiments, the method further includes generating the solvent vapor from liquid solvent inside the inner chamber (e.g., by boiling or evaporation).

In some embodiments, the method further includes generating the solvent vapor from liquid solvent outside the inner chamber (e.g., by boiling or evaporation), and then passing the solvent vapor into the inner chamber.

In some embodiments, the generating step is carried out by heating the liquid solvent, bubbling gas (e.g., air) through the liquid solvent, or a combination thereof (e.g., by heating the gas).

In some embodiments, the flooding and spinning steps are carried out at ambient pressure and temperature.

In some embodiments, the solvent is selected from the group consisting of methanol, acetone, and isopropanol.

In some embodiments, the solvent is a non-flammable organic solvent (e.g., trichlorethylene, methylene chloride, NOVEC™ solvent, VERTREL™ solvent, etc.).

In some embodiments, the solvent comprises, consists of, or consists essentially of a nonpolar organic solvent (e.g., pentane, hexane, heptane, benzene, toluene, 1,4 dioxane, diethyl ether, diisopropyl ether, tetrahydrofuran, etc., including combinations thereof).

In some embodiments, the spinning step is followed by the steps of:

condensing the solvent vapor to produce recovered liquid solvent, collecting the recovered liquid solvent, and optionally (but in some embodiments preferably)

re-volatilizing the recovered liquid solvent, and then repeating steps (a) to (c) with the re-volatized recovered liquid solvent and a subsequent additively manufactured object.

In some embodiments, the flooding and spinning steps are followed by the step of washing the object with a liquid organic solvent for a time sufficient to separate additional residual resin from the object, the washing optionally but preferably carried out in the centrifugal separator inner chamber.

In some embodiments, the light polymerized resin includes a dual cure resin, and the method further includes, after said spinning step (c), the step of: (d) further curing said object. The resin may include a mixture of a light polymerizable liquid first component and a second solidifiable component that is different from said first component (in some embodiments, the second solidifiable component includes at least one precursor to a silicone polymer, an epoxy polymer, a cyanate ester polymer, a natural rubber, a polyurethane, a polyurea, or copolymer thereof); and the further curing step may be carried out by heating and/or microwave irradiating the second solidifiable component, irradiating the second solidifiable component with light at a wavelength different from that of the light in the irradiating step, contacting the second solidifiable component to water, contacting the second solidifiable component to a catalyst, or a combination thereof.

In some embodiments, the flooding step and said spinning step are carried out in an inert atmosphere (e.g., an atmosphere enriched with nitrogen, argon, carbon dioxide, etc., or a combination thereof)

In some embodiments, the spinning step is carried out with passive balancing (e.g., passive mechanical balancing).

In some embodiments, the object includes a plurality of surface portions oriented differently from one another (e.g., interior and exterior surfaces; horizontal and vertical surfaces; surfaces oriented at obtuse or acute angles to one another; different sections of convex or concave curved surface portions, combinations of the foregoing; etc.).

In some embodiments, the object is an electrical, mechanical, or fluid connector, a fluid conduit, a cushion comprised of a lattice of interconnected struts and/or a triply periodic surface lattice, or the like.

According to some embodiments of the present invention, an apparatus for separating residual resin from additively manufactured objects, includes:

(a) a chamber;
(b) a rotor in the chamber;
(c) at least one, or a plurality of, stereolithography build platform mount connected to the rotor; and
(d) an organic solvent vapor generator operatively associated with the chamber.

In some embodiments, the vapor generator includes a solvent pool in the chamber, a gas line operatively associated with the pool for bubbling gas through solvent in the pool, and optionally a heater operatively associated with the gas line, the pool, or both the gas line and the pool.

In some embodiments, the vapor generator is positioned outside the chamber and in fluid communication with the chamber, for generating a vapor outside the chamber and passing the vapor into the chamber.

In some embodiments, the solvent vapor generator includes a liquid solvent pool in the chamber, a liquid solvent supply operatively associated with the pool, and optionally a heater operatively associated with the pool.

In some embodiments, the apparatus further includes: (e) a solvent vapor condenser operatively associated with the chamber.

In some embodiments, the apparatus further includes: (f) a residual resin drain in fluid communication with the chamber.

In some embodiments, the build platform mount(s) are configured for adjusting the angle at which said build platform(s) are positioned with respect to the rotor or the rotor axis of rotation.

Solvent vapor polishing of additively manufactured polymer products is known and described in, for example, Zortrax PCT patent Application Pub. No. WO2020/007443 (Jan. 9, 2020). That solvent vapor would be effective in facilitating the centrifugal removal of residual surface resin is, however, neither described nor suggested therein.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Resins and Additive Manufacturing Steps.

Resins. While any suitable resin can be used in the methods described herein, in some embodiments dual cure resins are preferred Such resins are known and described in, for example, U.S. Pat. Nos. 9,676,963, 9,453,142 and 9,598,606 to Rolland et al. Particular examples of suitable dual cure resins include, but are not limited to, Carbon Inc. medical polyurethane, elastomeric polyurethane, rigid polyurethane, flexible polyurethane, cyanate ester, epoxy, and silicone dual cure resins, all available from Carbon, Inc., 1089 Mills Way, Redwood City, Calif. 94063 USA.

Additive manufacturing. Techniques for producing an object, including "green" intermediate objects, from such resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci.* USA 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, S Patent Application Pub. No. US 2017/0129167 (May 11, 2017); B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018); L. Robeson et al., PCT Patent Pub. No WO 2015/164234 (see also U.S. Pat. Nos. 10,259,171 and 10,434,706): and C. Mirkin et al., PCT Patent Pub. No. WO 2017/210298 (see also VS Pat. App. US 2019/0160733).

2. Vapor Spin Cleaning Apparatus and Methods.

Non-limiting examples of apparatus are given in FIGS. 1-5 herein. All include a rotor 31 in a sealable collection vessel, or chamber, 33. One, or a plurality of, additive manufacturing build platforms 10 may be removably connected to the rotor by platform mounts 32. Additively manufactured objects 11 of different configurations that have been produced on the build platforms in a preceding additive manufacturing step are shown in the Figures, all having a coating of residual resin 111 thereon to be centrifugally separated from the objects. The objects comprise a plurality of surface portions oriented differently from one another (e.g., interior and exterior surfaces (e.g., 11a, 11b); horizontal and vertical surfaces (e.g., 11b, 11c); surfaces oriented at obtuse, acute, or right angles to one another (e.g., 11x, 11y); different sections of convex or concave curved surface portions (e.g., 11e, 11f). Objects of other configurations, including combinations of the foregoing, can also be cleaned by the methods and apparatus described herein. Such configurations of surfaces are commonly found in, for example, electrical, mechanical, and fluid connectors, fluid conduits, cushions, pads, or structural components comprised of a lattice of interconnected struts and/or a triply periodic surface lattice, and the like.

Figure 1:
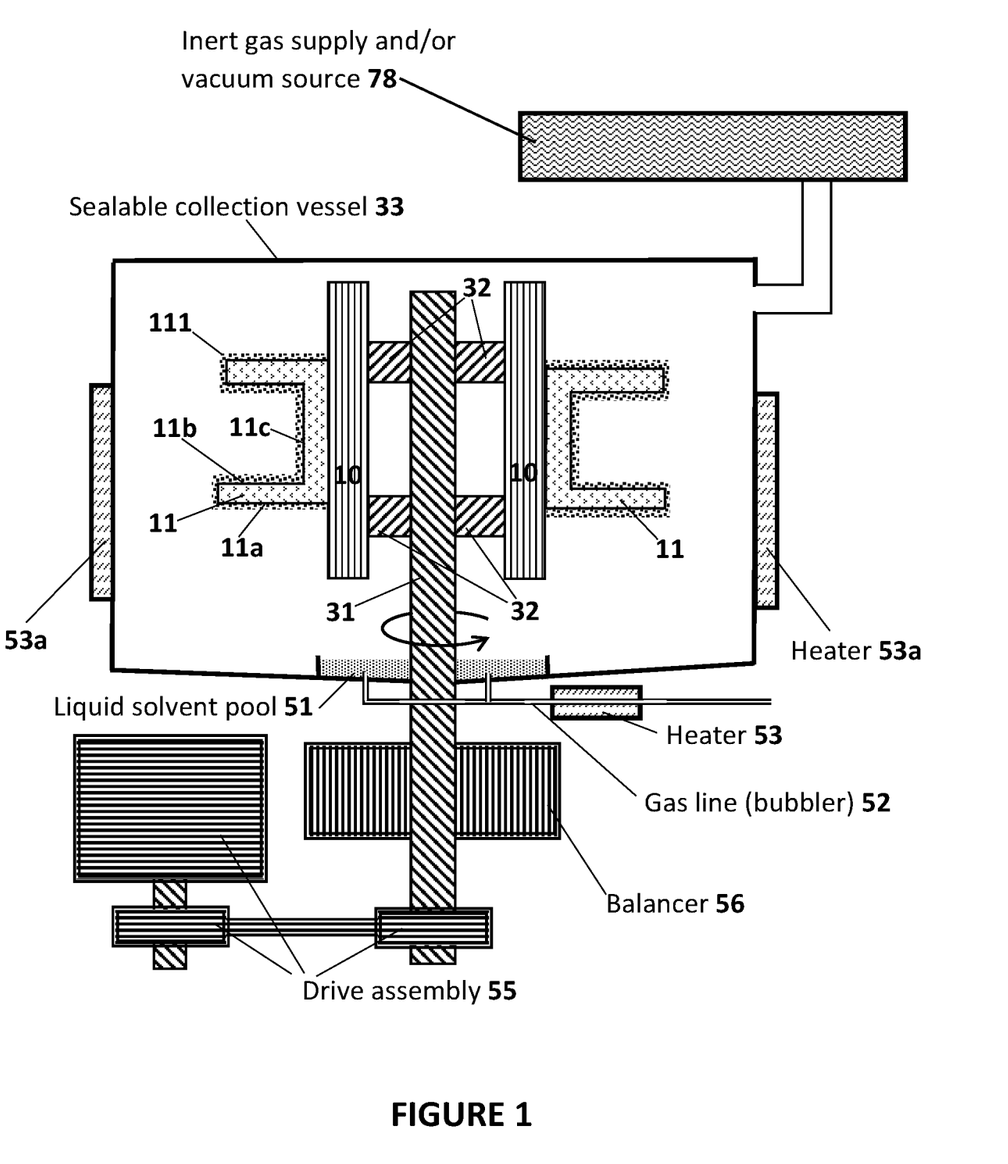
FIG. 1 schematically illustrates a first embodiment of methods and apparatus as described herein.
Figure 2:
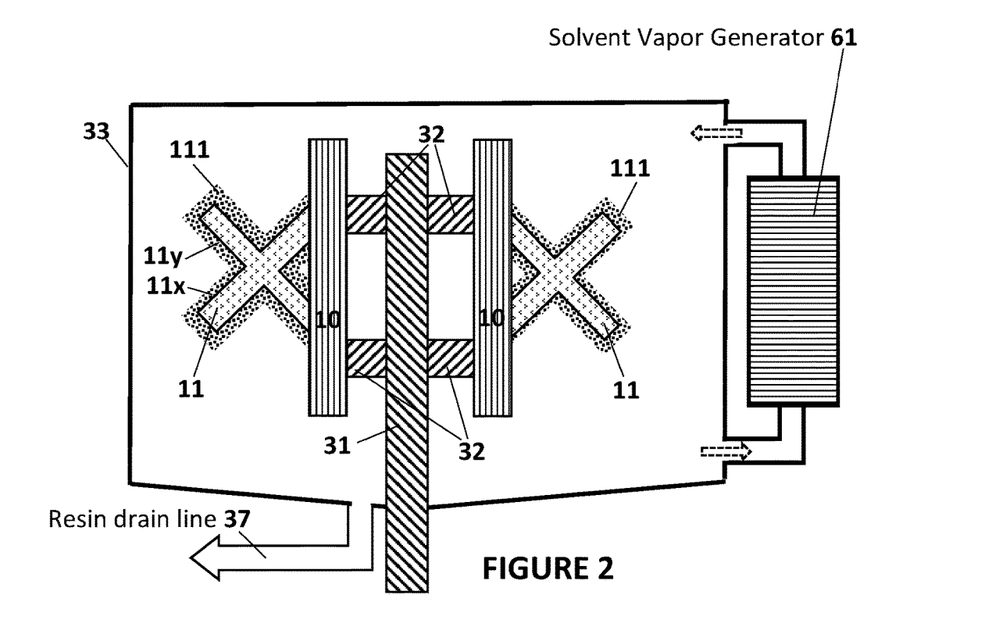
FIG. 2 schematically illustrates a second embodiment of methods and apparatus as described herein.
Figure 3:
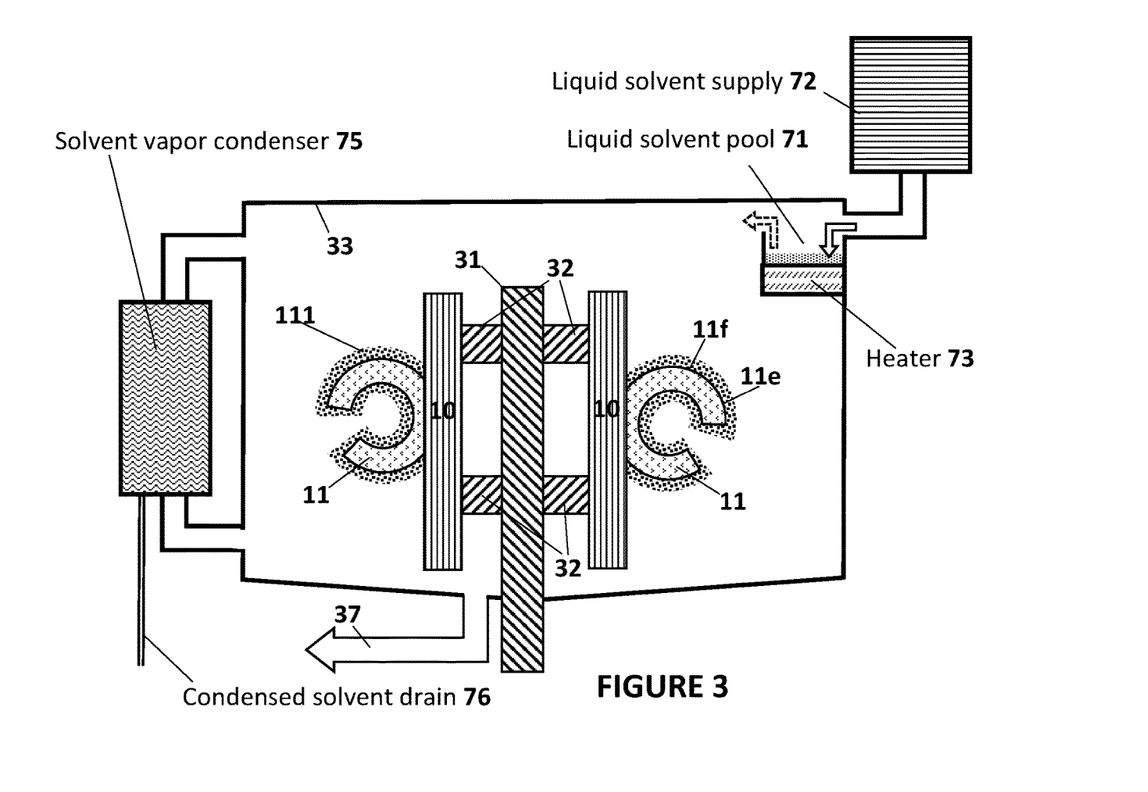
FIG. 3 schematically illustrates a third embodiment of methods and apparatus as described herein.
Figure 4:
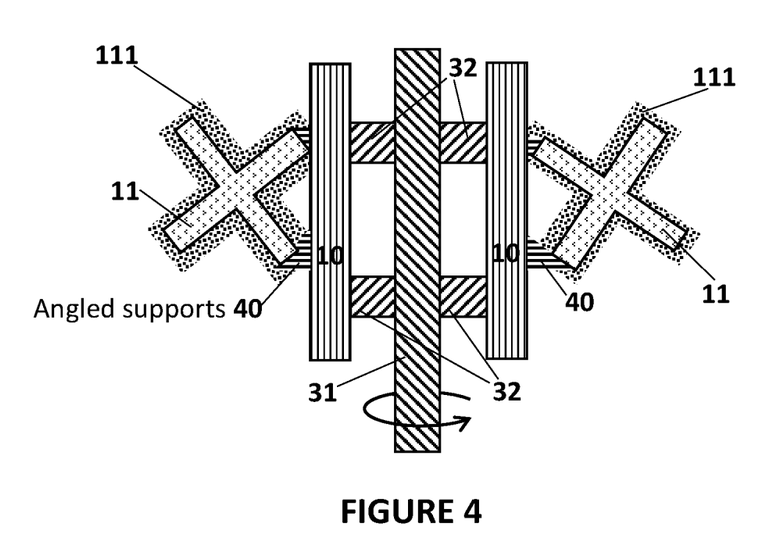
FIG. 4 schematically illustrates angling of objects during centrifugal separation by additively manufacturing the objects on an angled support assembly.
Figure 5:
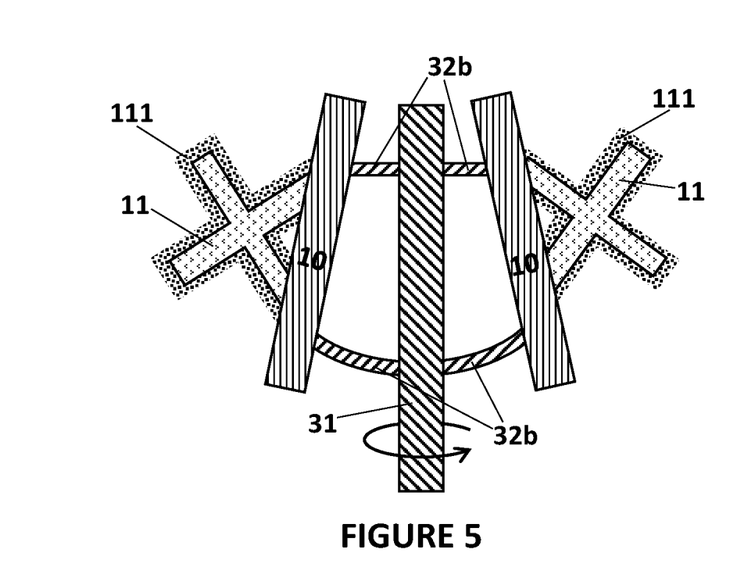
FIG. 5 schematically illustrates angling of objects during centrifugal separation by angling the build plate on which the objects are on using an adjustable mount in the centrifugal separator FIG. 6 schematically illustrates both mounting of build platforms in an inward-facing orientation, and angling of the objects for centrifugal separation, for the purpose of directing the flow of resin off of the build platform to a lower region of the vessel.

FIGS. 1-3 illustrate different approaches to providing a solvent vapor in the chamber without spraying a liquid solvent onto the objects. FIGS. 4-5 illustrate different approaches to angling the objects for centrifugal separation of residual resin, which can be incorporated into any of the embodiments of FIGS. 1-3.

Vapor generators for use as described herein can be configured in a variety of ways, all of which avoid spraying liquid solvent on the objects from which residual resin is to be separated. For example, the embodiment of FIG. 1 includes a solvent pool 51 in the chamber, a gas line 52 operatively associated with that pool for bubbling gas (such as ambient air) through the solvent in the pool. As the bubbles pass through the liquid solvent they absorb volatilized solvent and carry it into the main chamber space. A heater 53 can, if desired, be operatively associated with the gas line, the pool, or both the gas line and the pool, to aid in the volatilization of the liquid solvent. Additionally, or in the alternative to the foregoing, at least one heater 53a such as a resistive heater can be connected to, or otherwise operatively associated with, the collection vessel 33, such as by fixing to the inside or outside wall of the vessel, to facilitate forming or maintaining the solvent vapor in the vessel, in any of the embodiments described herein.

A drive assembly 55 can be operatively associated with the rotor 31, directly or indirectly (e.g., a belt drive) by any suitable technique. In preferred embodiments, a balancer 56 is also operatively associated with the rotor. Inclusion of a balancer advantageously permits mounting of multiple build platforms 10 carrying objects of different size, shape, and or/weight, or distributed in a different pattern on the build platforms. This is particularly advantageous for automated systems in which different build platforms mounted in the device carry objects of the same type (e.g., all dental molds; all midsoles, etc.) but the objects have automatically been generated in a different size or shape, and/or distributed in different patterns on different platforms. Suitable balancers include, but are not limited to, mechanical or passive balancers such as LeBlanc balancers (hydrodynamic balancers), ball balancers (including ring balancers), and pendulum balancers (See generally U.S. Pat. No. 1,209,730 to Leblanc; U.S. Pat. No. 2,549,756 to Kendall; M. Makram et al., *Effect of automatic ball balancer on unbalanced rotor vibration*, Paper ASAT-17-130-ST, 17$^{th}$ International Conference on Aerospace Sciences & Aviation Technology (Apr. 11-13, 2017)).

Because the solvent vapor atmosphere in the vessel can be flammable, an inert gas supply 78 is preferably operably associated with the collection vessel, for supplying an inert gas into the vessel in a vapor ignition-inhibiting amount. Any inert gas can be used, examples of which include, but are not limited to, nitrogen, argon, carbon dioxide, and combinations thereof. Nitrogen is currently preferred. Further, a vacuum source can be included, as an alternative to or in combination with an inert gas supply, the two together configured to create a vapor ignition inhibiting atmosphere in the vessel.

In another alternative shown in FIG. 2, an external vapor generator 61 is positioned outside the chamber, and generates a solvent vapor outside the chamber which is then passed into the chamber. The ambient atmosphere within the chamber can be directed back to the vapor generator, though this is not essential. Heaters, drives, balancers, and inert gas supplies can be included in like manner as described in connection with FIG. 1 above, in this embodiment and those examples set forth below.

In the embodiment of FIG. 3, the solvent vapor generator comprises a liquid solvent pool 71 in the chamber, a liquid solvent supply 72 operatively associated with said pool, and optionally a heater 73 operatively associated with said pool. An example of a suitable bubbler is a Duran bubbler set with frit DO, available from Paul Gothe GmbH, Wittener Str. 82, D-44789, Bochum, Germany. A solvent vapor condenser 75 can optionally be operatively associated with the chamber, for collecting condensed solvent and collecting it with a drain line 76 (a feature that can likewise be incorporated into the embodiments of FIGS. 1-2). Any of the aforesaid embodiments can include a residual resin drain line 37 operatively associated with the chamber for collecting, and optionally reusing, the collected residual resin (e.g., by blending with fresh resin and using for subsequent additive manufacturing steps).

While FIGS. 1-3 show the build platform mounted vertically and parallel to the rotor axis of rotation (or with a build surface of the build platform parallel to the rotor axis of rotation), they, or the objects formed thereon, may be oriented at an angle (e.g., up to 5 or ten degrees offset from vertical) if this facilitates resin removal from particular objects. An angled orientation may be achieved by producing the objects on angled supports 40 as shown in FIG. 4, or by incorporating adjustable build platform mounts 32b to connect the build platform(s) to the rotor, as shown in FIG. 5. In general, at higher spin speeds, too great an angle can result in sideways forces on the objects, that may then cause the objects to distort or separate from the build platform. Lower spin speeds can accommodate greater angles or tilts, but this may result in longer residual resin separation times.

Figure 6:
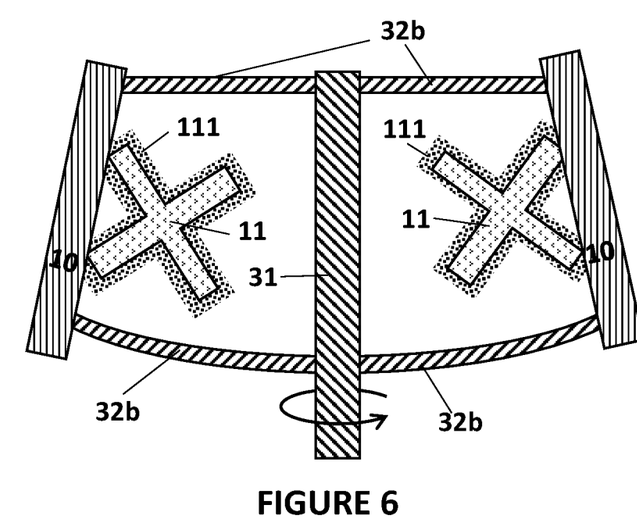
Figure 7:
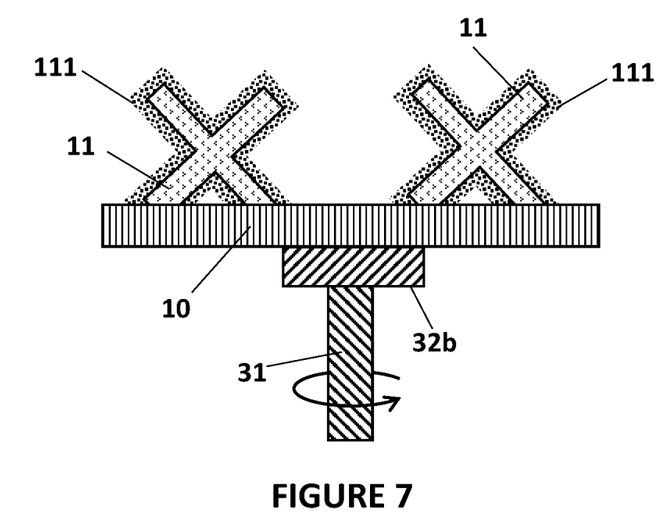
FIG. 7 schematically illustrates objects on a horizontally mounted (i.e., "turntable style") centrifuge for separation.

Also, while the Figures show the build platforms (or build surfaces) facing outward, in some embodiments the build platforms can face inward, toward the rotor. For such embodiments a perforated build platform, or build platforms with channels to direct the flow of residual resin, may be used. In embodiments such as these the platforms can also be tilted to facilitate or direct resin removal, as shown in FIG. 6. And in some embodiments the build platform can be mounted horizontally on the rotor, in the manner of a turntable, as shown in FIG. 7.

In some other embodiments, the chamber can be connected to the rotor. The build platform with the object thereon can be in the chamber. The chamber can be flooded with a volatile organic solvent vapor without contacting liquid organic solvent to the object, and the chamber with the build platform and the object therein can be spun to centrifugally separate at least a first portion of the residual resin from the object.

Suitable solvents for volatilization in the methods and apparatus include, but are not limited to, alcohol, ester, dibasic ester, ketone, acid, aromatic, hydrocarbon, ether, dipolar aprotic, halogenated, and base organic solvents, and combinations thereof. In some embodiments, the solvent comprises a hydrofluorocarbon, a hydrofluoroether, or a combination thereof. In some embodiments, the solvent is or includes an azeotropic mixture comprised of at least a first organic solvent and a second organic solvent. Solvents can be heated to aid in their volatilization as necessary, and the inner chamber of the separator can be heated to maintain the solvent in a volatile state as necessary. Particular examples of solvents include, but are not limited to, methanol, acetone, isopropanol, and non-flammable organic solvents (e.g., trichlorethylene, methylene chloride, NOVEC™ solvent, VERTREL™ solvent, etc.)

While in some embodiments the methods described herein obviate the need for a wash step with a liquid solvent, in some situations an abbreviated wash or rinse step may be included after the vapor separation step described above, in accordance with known techniques or an apparatus such as described in C. Converse et al., *Methods and apparatus for washing objects produced by stereolithography*, US Patent Application Pub. No. 20200078831 (Mar. 12, 2020). In some embodiments, the centrifugal separation may be a wash apparatus such as described in Converse et al., modified to carry out centrifugal separation in the presence of a solvent vapor without liquid solvent present, as described above, and then subsequently introduce a wash liquid for a conventional, yet abbreviated, wash step.

According to some embodiments, a method of cleaning residual resin from an additively manufactured object, includes:

(a) enclosing an additively manufactured object in an inner chamber of a centrifugal separator, the additively manufactured object including a light polymerized resin with a surface coating of viscous, unpolymerized, residual resin;

(b) flooding the chamber with a volatile organic solvent vapor without contacting liquid organic solvent to the object, the vapor present in an amount sufficient to reduce the viscosity of the residual resin; and (c) spinning the additively manufactured object in the chamber to centrifugally separate at least a first portion of the residual resin from the object.

In some embodiments, the method further includes generating the solvent vapor from liquid solvent inside said inner chamber.

In some embodiments, the method further includes generating the solvent vapor from liquid solvent outside the inner chamber, and then passing the solvent vapor into the inner chamber.

In some embodiments, the generating step is carried out by heating the liquid solvent, bubbling gas (e.g., air) through the liquid solvent, or a combination thereof.

In some embodiments, the flooding and spinning steps are carried out at ambient pressure and temperature.

In some embodiments, the solvent is selected from the group consisting of methanol, acetone, and isopropanol.

In some embodiments, the solvent is a non-flammable organic solvent (e.g., trichlorethylene, methylene chloride, NOVEC™ solvent, VERTREL™ solvent, etc.)

In some embodiments, the spinning step is followed by the steps of:

condensing the solvent vapor to produce recovered liquid solvent, collecting the recovered liquid solvent, and optionally (but in some embodiments preferably)

re-volatilizing the recovered liquid solvent and then repeating steps (a) to (c) with the re-volatized recovered liquid solvent (which can be mixed with additional fresh solvent) and a subsequent additively manufactured object.

In some embodiments, the flooding and spinning steps are followed by the step of washing the object with a liquid organic solvent for a time sufficient to separate additional residual resin from the object, the washing optionally but preferably carried out in the centrifugal separator inner chamber.

In some embodiments, the light polymerized resin includes a dual cure resin, and the method further includes, after said spinning step (c), the step of: (d) further curing said object. The resin may include a mixture of a light polymerizable liquid first component and a second solidifiable component that is different from said first component (in some embodiments, the second solidifiable component includes at least one precursor to a silicone polymer, an epoxy polymer, a cyanate ester polymer, a natural rubber, a polyurethane, a polyurea, or copolymer thereof); and the further curing step may be carried out by heating and/or microwave irradiating the second solidifiable component, irradiating the second solidifiable component with light at a wavelength different from that of the light in the irradiating step, contacting the second solidifiable component to water, contacting the second solidifiable component to a catalyst, or a combination thereof.

In some embodiments, the object includes a plurality of surface portions oriented differently from one another (e.g., interior and exterior surfaces; horizontal and vertical surfaces; surfaces oriented at obtuse or acute angles to one another; different sections of convex or concave curved surface portions, combinations of the foregoing; etc.).

In some embodiments, the object is an electrical, mechanical, or fluid connector, a fluid conduit, a cushion comprised of a lattice of interconnected struts and/or a triply periodic surface lattice, or the like.

According to some embodiments, an apparatus for separating residual resin from additively manufactured objects, includes:

(a) a chamber 33;

(b) a rotor 31 in the chamber;

(c) at least one, or a plurality of, stereolithography build platform mount 32 connected to the rotor; and (d) an organic solvent vapor generator operatively associated with the chamber.

In some embodiments, the vapor generator includes a solvent pool 51 in the chamber, a gas line 52 operatively associated with the pool for bubbling gas through solvent in the pool, and optionally a heater 53 operatively associated with the gas line, the pool, or both the gas line and the pool.

In some embodiments, the vapor generator 61 is positioned outside the chamber and in fluid communication with the chamber, for generating a vapor outside the chamber and passing said vapor into the chamber.

In some embodiments, the solvent vapor generator includes a liquid solvent pool 71 in the chamber, a liquid solvent supply 72 operatively associated with the pool, and optionally a heater 73 operatively associated with the pool.

The precise type of vapor generator used is not critical and will depend upon factors such as the number of separators for which a vapor is generated (i.e., a single vapor source for one, two, three or more centrifugal separators), the volume of the chamber(s) being flooded with vapor, the operating temperature and pressure of the apparatus, etc. Additional examples of suitable vapor generators include, but are not limited to, liquid source bubblers (or "CVD bubblers") such as MSP Turbo™ vaporizers (available from TSI Incorporated, 500 Cardigan Road, Shoreview, Minn. 55126 USA), direct liquid injection (DLI) vaporizers such as VAPBOX™ vaporizers (available from Kemstream, 139 Rue des Walkyries, 34000 Montpellier, France), tornado flow vaporizers such as the MV-2000 series mixed injection system liquid vaporizers (available from Horiba Instruments Inc., 430 Indio Way, Sunnyvale, Calif. 94085 USA), falling film vaporizers, and other apparatus for creating a vapor from a liquid by boiling or evaporation.

In some embodiments, the apparatus further includes: (e) a solvent vapor condenser 75 operatively associated with the chamber.

In some embodiments, the apparatus further includes: (f) a residual resin drain 37 in fluid communication with the chamber.

In some embodiments, the build platform mount(s) are configured for adjusting the angle at which said build platform(s) are positioned with respect to the rotor or the rotor axis of rotation.

3. Further Curing.

In the case of dual cure resins, once the intermediate object has been formed and cleaned as described above, the object is then further cured, such as by heating. Heating may be active heating (e.g., baking in an oven, such as an electric, gas, solar oven, or microwave oven, or combination thereof), or passive heating (e.g., at ambient (room) temperature). Active heating will generally be more rapid than passive heating and is typically preferred, but passive heating—such as simply maintaining the intermediate at ambient temperature for a sufficient time to effect further cure—may in some embodiments also be employed.

Example 1

Swelling of Objects

Swelling of additively manufactured objects is a problem because, as the parts swell by taking up a solvent, it expands and can cause distortion or delamination from the platform on which it is being spun (depending on dimensions and geometry). Hence, in some embodiments, preferred solvents are those that solvate (and reduce the viscosity of) the resin, but does not swell the parts. For dual cure resins such as polyurethane dual cure resins (e.g., Carbon, Inc. RPU130 polyurethane dual cure resin) non-polar solvents such as ethers (diisopropyl ether) and alkanes (such as heptane) work well as vapor spinning solvents.

Example 2

Mass Loss Warpage

An important goal of the methods described herein is to reduce mass loss warpage of the additively manufactured object resulting from separation of residual resin therefrom. In some embodiments we observe that mass loss warpage of parts cleaned as described herein can vary depending on the vapor conditions. Lower vapor concentrations (significantly below those seen by spraying objects with liquid solvent), optionally coupled with longer spin times and/or higher spin speeds, do a better job of reducing mass loss warpage in these cases.

The foregoing is illustrative of the present invention, and is not to be construed as limiting thereof. The invention is defined by the following claims, with equivalents of the claims to be included therein.

We claim:

1. A method of cleaning residual resin from an additively manufactured object, comprising the steps of:
   (a) enclosing an additively manufactured object in an inner chamber of a centrifugal separator, the additively manufactured object comprising a polymerized resin with a surface coating of a viscous, unpolymerized, residual resin;
   (b) providing a liquid organic solvent;
   (c) generating a volatile organic solvent vapor from the liquid organic solvent;
   (d) cleaning said residual resin from said object by flooding said inner chamber with said volatile organic solvent vapor in an amount sufficient to reduce a viscosity of said residual resin, wherein said liquid organic solvent does not contact said object; and
   (e) spinning said additively manufactured object in said chamber to centrifugally separate at least a first portion of said residual resin from said object.

2. The method of claim 1, further comprising generating said volatile organic solvent vapor from said liquid organic solvent inside said inner chamber.

3. The method of claim 1, further comprising generating said volatile organic solvent vapor from said liquid organic solvent outside said inner chamber, and then passing said volatile organic solvent vapor into said inner chamber.

4. The method of claim 1, wherein said cleaning and spinning steps are carried out at ambient pressure and temperature.

5. The method of claim 1, wherein said liquid organic solvent is selected from the group consisting of methanol, acetone, isopropanol, and a non-flammable organic solvent.

6. The method of claim 1, wherein said liquid organic solvent comprises a nonpolar organic solvent.

7. The method of claim 1, wherein said spinning step is followed by the steps of:
   condensing said volatile organic solvent vapor to produce recovered liquid solvent,
   collecting said recovered liquid solvent, and optionally re-volatilizing said recovered liquid solvent, and then
   repeating steps (a) to (e) with said re-volatized recovered liquid solvent and a subsequent additively manufactured object.

8. The method of claim 1, wherein said cleaning and spinning steps are followed by a step of washing said object in said inner chamber of said centrifugal separator for a time sufficient to separate additional residual resin from the object.

9. The method of claim 1, wherein said polymerized resin comprises a dual cure resin, said method further comprising, after said spinning step (e), the step of:
   (f) further curing said object.

10. The method of claim 1, wherein said cleaning step and said spinning step are carried out in an inert atmosphere.

11. The method of claim 1, wherein said spinning step is carried out with passive balancing.

12. The method of claim 1, wherein said object comprises a plurality of surface portions oriented differently from one another.

13. The method of claim 1, wherein said object is an electrical, mechanical, or fluid connector, a fluid conduit, a cushion comprised of a lattice of interconnected struts and/or a triply periodic surface lattice.

14. The method of claim 2, wherein said generating step is carried out by heating said liquid organic solvent, bubbling gas through said liquid organic solvent, or a combination thereof.

15. The method of claim 9, wherein:
   said resin comprises a mixture of a polymerizable liquid first component and a second solidifiable component, wherein the second solidifiable component comprises at least one precursor to a silicone polymer, an epoxy polymer, a cyanate ester polymer, a natural rubber, a polyurethane, a polyurea, or copolymer thereof; and
   said further curing step is carried out by heating and/or irradiating said second solidifiable component, contacting said second solidifiable component to water, contacting said second solidifiable component to a catalyst, or a combination thereof.

\* \* \* \* \*